(12) United States Patent
Liu et al.

(10) Patent No.: US 12,189,172 B2
(45) Date of Patent: Jan. 7, 2025

(54) BACKLIGHT MODULE AND DISPLAY DEVICE

(71) Applicant: Wuhan China Star Optoelectronics Technology Co., Ltd., Hubei (CN)

(72) Inventors: Fancheng Liu, Hubei (CN); Chao Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 859 days.

(21) Appl. No.: 16/966,001

(22) PCT Filed: Apr. 8, 2020

(86) PCT No.: PCT/CN2020/083719
§ 371 (c)(1),
(2) Date: Jul. 30, 2020

(87) PCT Pub. No.: WO2021/103375
PCT Pub. Date: Jun. 3, 2021

(65) Prior Publication Data
US 2023/0251416 A1 Aug. 10, 2023

(30) Foreign Application Priority Data
Nov. 26, 2019 (CN) .......................... 201911169777.X

(51) Int. Cl.
*F21V 8/00* (2006.01)

(52) U.S. Cl.
CPC ......... *G02B 6/0086* (2013.01); *G02B 6/0055* (2013.01); *G02B 6/0068* (2013.01)

(58) Field of Classification Search
CPC .. G02B 6/0086; G02B 6/0055; G02B 6/0068; G06F 1/1605; G06F 1/1686; H04N 23/56
See application file for complete search history.

(56) References Cited

U.S. PATENT DOCUMENTS

| 10,684,410 | B2 * | 6/2020 | Li | G02F 1/133308 |
|---|---|---|---|---|
| 11,316,960 | B2 * | 4/2022 | Jun | H04M 1/0264 |
| 11,393,415 | B2 * | 7/2022 | Liu | G02F 1/1339 |
| 11,407,678 | B2 * | 8/2022 | Hwang | H04M 1/0264 |
| 2018/0335667 | A1 | 11/2018 | Wang et al. | |
| 2020/0278488 | A1 * | 9/2020 | Terazawa | G02B 6/0055 |
| 2021/0072594 | A1 | 3/2021 | Zhang et al. | |
| 2021/0072599 | A1 | 3/2021 | Mei et al. | |
| 2022/0321747 | A1 * | 10/2022 | Hou | H04N 23/55 |

FOREIGN PATENT DOCUMENTS

| CN | 207264062 | | 4/2018 | |
|---|---|---|---|---|
| CN | 108181762 | A * | 6/2018 | ........... G02B 6/0021 |
| CN | 108469704 | | 8/2018 | |
| CN | 108469704 | A * | 8/2018 | ....... G02F 1/133603 |
| CN | 108957845 | | 12/2018 | |

(Continued)

*Primary Examiner* — Arman B Fallahkhair

(57) ABSTRACT

The present invention provides a backlight module and a display device. The present invention splices a substrate on a reflection plate. The reflection layer can effectively replace the reflection plate in function because of a high reflectivity of the reflection layer on the spliced portion between the substrate and the reflection plate, which guarantees extension of light and lowers requirement for assembling precision.

10 Claims, 2 Drawing Sheets

(56) References Cited

FOREIGN PATENT DOCUMENTS

| | | | | |
|---|---|---|---|---|
| CN | 208384291 U | * | 1/2019 | ............ H04M 1/026 |
| CN | 109709711 | | 5/2019 | |
| CN | 109709713 | | 5/2019 | |
| CN | 109901327 | | 6/2019 | |
| CN | 208953838 | | 6/2019 | |
| CN | 110161749 | | 8/2019 | |
| CN | 110187559 | | 8/2019 | |
| CN | 110231735 | | 9/2019 | |
| CN | 209373303 | | 9/2019 | |
| CN | 110908186 | | 3/2020 | |
| JP | 2010-008837 | | 1/2010 | |
| WO | WO 2019/203598 | | 10/2019 | |

* cited by examiner

BACKLIGHT MODULE AND DISPLAY DEVICE

RELATED APPLICATIONS

This application is a National Phase of PCT Patent Application No. PCT/CN2020/083719 having International filing date of Apr. 8, 2020, which claims the benefit of priority of Chinese Patent Application No. 201911169777.X filed on Nov. 26, 2019. The contents of the above applications are all incorporated by reference as if fully set forth herein in their entirety.

FIELD AND BACKGROUND OF THE INVENTION

The present invention relates to a field of display technologies, especially to a backlight module and a display device.

With improvement of entire capabilities of processing designs of cell phones, consumer aesthetics are also constantly being guided and improved. Therefore, the overall trend of cell phone screen is gradually transformed into the design direction of full screen. Therefore, in display screens such as chip on films (COFs), super narrow bezels, shaped screens, the design capability and process capability of full screen related indicators have been continuously improved in less than a year, and the screen ratio of screen has gradually increased from 80% to 97%. However, with the rapid improvement of the above capabilities, the relative bottleneck period has now been reached. Therefore, an in-screen hole formation technology has been set forth, inner surface hole formation can further improve a screen ratio to enhance beauty of the process design of the whole machine. At present, the in-screen hole formation technology, for enhancing light transmission of a display panel, generally defines holes in upper and lower polarizers. Therefore, an under-screen camera is visible under a screen-off state (standby mode), which affects the entirety of the display screen.

SUMMARY OF THE INVENTION

Therefore, the conventional technology has a solution of retaining liquid crystal and a polarizer, and a color filter substrate including no color resist in a via hole region. Such solution retains the polarizer can achieve an invisible camera under a screen-off state and employs thin film transistors disposed on an edge of a seal frame to increase the aperture rate, and the via hole has no color resist solution to enhance a light input of a camera as possible. However, the via hole region has no color resist solution and cannot normally display RGB colored screen images. Further, to guarantee an imaging effect of the camera, the color filter substrate side cannot prevent the RGB color resist because the RGB color resist absorbs light.

Therefore, the present invention provides a backlight module and display device to achieve a true full screen technology.

The present invention solves the technical issue by splicing a substrate on a reflection plate, and the reflection layer can effectively replace the reflection plate in function because of a high reflectivity of the reflection layer on the spliced portion between the substrate and the reflection plate, which guarantees extension of light and lowers requirement for assembling precision.

To solve the above issue, the present invention provides a backlight module, comprising: a substrate comprising a first via hole defined in the substrate; a reflection plate disposed around the substrate; a light emitting layer disposed on the substrate and comprising a second via hole defined in the light emitting layer and corresponding to the first via hole; a backlight source disposed at an end of the reflection plate; and a light guide plate disposed on the reflection plate.

Furthermore, a reflection layer is disposed between the substrate and the light emitting layer, material of the reflection layer is high reflection white oil.

Furthermore, an area of the light guide plate is greater than or equal to an area of the reflection plate.

Furthermore, the light guide plate and the light emitting layer are arranged abreast, and a portion of the light guide plate is disposed on the reflection layer.

Furthermore, the light guide plate is disposed around the reflection layer.

Furthermore, the backlight module further comprises: a transparent film layer disposed on the light emitting layer and the reflection layer, wherein material of the transparent film layer is silicone; and a diffusion film disposed on a side of the light guide plate away from the reflection plate.

Furthermore, a third via hole is defined in the diffusion film and corresponds to the second via hole.

Furthermore, a diameter of the third via hole is greater than a diameter of the second via hole; and the diameter of the second via hole is equal to a diameter of the first via hole.

Furthermore, the light emitting layer is a mini-light emitting diode (Mini-LED) light emitting layer and comprises a white light emitting unit, a red light emitting unit, a green light emitting unit and a blue light emitting unit.

The present invention also provides a display device comprising the backlight module as described above; wherein the display device further comprises a camera module disposed under the backlight module and corresponding to the first via hole.

Advantages of the present invention are as follows. The present invention provides a backlight module and a display device splicing a substrate on a reflection plate, and the reflection layer can effectively replace the reflection plate in function because of a high reflectivity of the reflection layer on the spliced portion between the substrate and the reflection plate, which guarantees extension of light and lowers requirement for assembling precision. Furthermore, the white light emitting unit can be used in the spliced portion. Mini-LEDs of different positions emitting light with different light intensities can be achieved by individual controls to mini-LEDs to further solve black edge and dark edge phenomenon on the spliced portion, which achieves better full screen display and compensates uneven emitting light phenomenon of the backlight module due to hole formation.

BRIEF DESCRIPTION OF THE SEVERAL VIEWS OF THE DRAWINGS

Specific embodiments of the present invention are described in details with accompanying drawings as follows to make technical solutions and advantages of the present invention clear.

DESCRIPTION OF SPECIFIC EMBODIMENTS OF THE INVENTION

Figure 1:
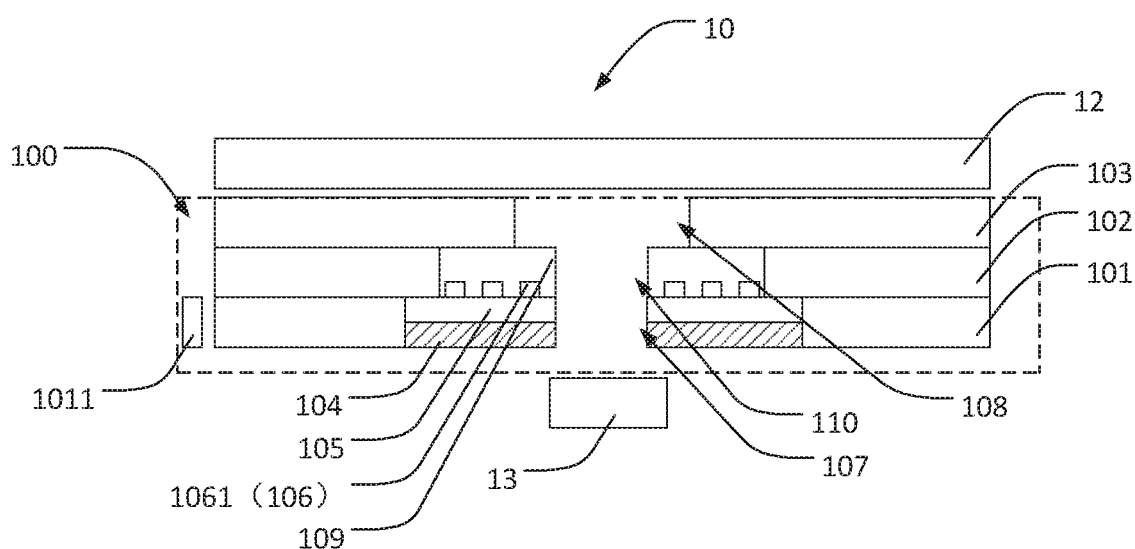
FIG. 1 is a schematic structural view of a display device of a first embodiment provided by the present invention.

The specific structural and functional details disclosed herein are merely representative and are intended to describe the exemplary embodiment of the present invention. However, the present invention may be embodied in many alternative forms and should not be construed to only be limited by the embodiment described here.

In the description of the present invention, it is to be understood that orientation or positional relationships indicated by terms "center", "lateral", "upper", "lower", "left", "right", "vertical", "horizontal", "top" "bottom", "inside", "outside", etc., are based on the orientation or positional relationship shown in the drawings, and are merely for convenience of describing the present invention and simplifying the description, rather than indicating or implying that the device or component must have a specific orientation and be configured and operated in a specific orientation, and therefore they cannot be understood as limitations to the present invention. Furthermore, the terms "first" and "second" are used for descriptive purposes only and are not to be construed as indicating or implying a relative importance or implicitly indicating the number of technical features indicated. Thus, a feature defining "first", "second" may explicitly or implicitly include one or more of the characteristics. In the description of the present invention, unless otherwise stated, "a plurality of" means two or more. In addition, the term "comprise" and any variant thereof is intended to cover non-exclusive inclusion.

In the description of the present invention, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present invention can be understood on a case-by-case basis.

The terminology used herein is only for the purpose of describing the particular embodiments instead of limiting exemplary embodiments. The singular forms "a", "an" also includes plural forms unless it is specified otherwise in the context. It is also to be understood that the terms "comprises" and/or "comprising", as used herein, are intended to mean the presence of the recited features, integers, steps, operations, units and/or components, and do not exclude the presence or addition of one or more other features, integers, steps, operations, units, components, and/or combinations thereof.

With reference to FIG. 1, the present invention first embodiment provides a backlight module 100, the backlight module 100 包括 a substrate 104, a reflection plate 101, a light guide plate 102, a diffusion film 103, a reflection layer 105, a transparent film layer 109, a backlight source 1011 and a via hole 107.

A first via hole 107 is defined in the substrate 104. The reflection plate 101 is disposed around the substrate 104.

The light emitting layer 106 is disposed on the substrate 104. A second via hole 110 is defied in the light emitting layer 106 and corresponds to the first via hole 107. The light emitting layer 106 is a mini-LED light emitting layer.

The backlight source 1011 is disposed on an end of the reflection plate 101.

The reflection layer 105 is disposed between the substrate 104 and the mini-LED light emitting unit 106. Material of the reflection layer 105 is high reflection white oil.

The light guide plate 102 is disposed on the reflection plate 101. The diffusion film 103 is disposed on a side of the light guide plate 102 away from the reflection plate 101.

An area of the light guide plate 102 is greater than an area of the reflection plate 101. As such, when the substrate 104 is spliced with the reflection plate 101, a portion of the substrate 104 can be dispose under the light guide plate 102.

During manufacturing, the substrate 104 is not picked and placed. Because the substrate covers the high reflection white oil, after spliced with the reflection plate 101, the spliced portion is covered by the light guide plate 102. Because white oil has high reflectivity characteristics, it can replace the reflection plate 101, which guarantees extension of light and lowers requirement for assembling precision.

The light guide plate 102 and the light emitting layer 106 are arranged abreast, and a portion of the light guide plate 102 is disposed on the reflection layer 105.

The diffusion film 103 has a third via hole 108 defined therein and corresponding to a light transmissive region 11 of the second via hole 110.

A diameter of the third via hole 108 is greater than a diameter of the second via hole 110. The diameter of the second via hole 110 is equal to a diameter of the first via hole 107.

A ratio of the diameter of the first via hole 107 to the diameter of the third via hole 108 is 6:5-2:1. The substrate 104 is a transparent substrate.

The transparent film layer 109 is disposed on the mini-LED light emitting unit 106 and the reflection layer 105. Material of the transparent film layer 109 is silicone. The backlight source 1011 is disposed on a side of the reflection plate 101.

On the spliced portion between the substrate 104 and the reflection plate 101, the reflection layer 105 can effectively replace the function of the reflection plate 101, which guarantees extension of light and lowers requirement for assembling precision because of the high reflectivity of the reflection layer 105.

The mini-LED light emitting unit 1061 comprises a white light emitting unit, a red light emitting unit, a green light emitting unit, and a blue light emitting unit.

On the spliced portion, the white light emitting unit can be used. Mini-LEDs of different positions emitting light with different light intensities can be achieved by individual controls to mini-LEDs to further solve black edge and dark edge phenomenon on the spliced portion, which achieves better full screen display and compensates uneven emitting light phenomenon of the backlight module 100 due to hole formation.

In a region corresponding to the spliced portion, the red light emitting unit, the green light emitting unit, and the blue light emitting unit can be employed to display images to further achieve full screen display.

The present invention also provides a display device 10, as shown in FIG. 1. The display device 10 comprises a display panel 12, a backlight module 100 and a camera module 13. The camera module 13 is disposed under the backlight module 100 and corresponds to the first via hole 117. The display panel 12 is located above the backlight module 100.

The first via hole 117, the second via hole 110 and the third via hole 108 can be combined into a combination hole to allow external light to pass through the combination hole to be received by the camera module.

The display device 10 splices the substrate 104 with the reflection plate, and the reflection layer 105 can effectively replace the reflection plate 101 in function because of a high reflectivity of the reflection layer 105 on the spliced portion between the substrate 104 and the reflection plate 101, which guarantees extension of light and lowers requirement for assembling precision. Furthermore on the spliced portion, the white light emitting unit can be used. Mini-LEDs of different positions emitting light with different light intensities can be achieved by individual controls to mini-LEDs to further solve black edge and dark edge phenomenon on the spliced portion, which achieves better full screen display and compensates uneven emitting light phenomenon of the backlight module 100 due to hole formation.

Figure 2:
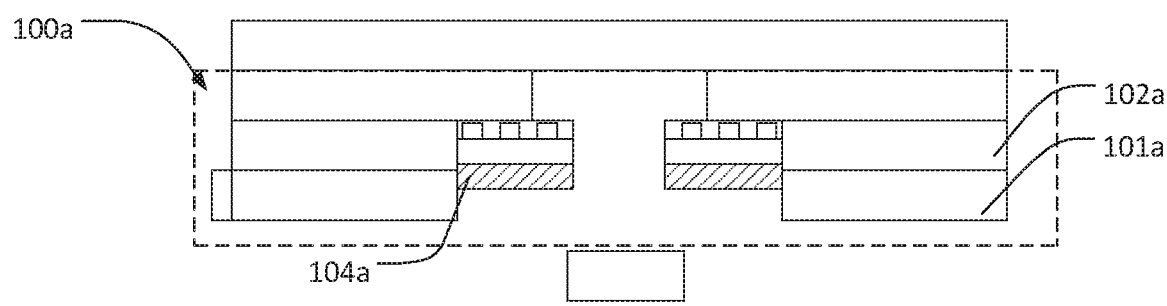
FIG. 2 is a schematic structural view of a display device of a second embodiment provided by the present invention.

With reference to FIG. 2, a second embodiment of the present invention provides a backlight module 100a, a difference of the second embodiment from the first embodiment is that the substrate 104a is spliced with the light guide plate and the reflection plate.

The area of the light guide plate 102a is equal to the area of the reflection plate 101a. The light guide plate is disposed around the reflection layer.

Furthermore, in comparison to the first embodiment, in the second embodiment, when spliced holes are defined in the reflection plate 101a and the light guide plate 102a, the two spliced holes are the same in dimension, and precision for defining the holes is lowered to facilitate manufacturing.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A backlight module, comprising:
   a substrate comprising a first via hole defined in the substrate;
   a reflection plate disposed around the substrate;
   a light emitting layer disposed on the substrate and comprising a second via hole defined in the light emitting layer and corresponding to the first via hole;
   a backlight source disposed at an end of the reflection plate;
   a light guide plate disposed on the reflection plate; and
   a reflection layer disposed between the substrate and the light emitting layer;
   wherein the substrate is connected to and staggered vertically with the reflection plate and the light guide plate and is substantially aligned with a boundary between the reflection plate and the light guide plate, and the reflection layer and the light emitting layer are connected to the light guide plate such that each of the substrate, the reflection plate, and the light guide plate is fixed to each of the substrate and the reflection plate such that the substrate, the reflection plate, and the light guide plate are mutually fixed together.

2. The backlight module as claimed in claim 1, wherein material of the reflection layer is high reflection white oil.

3. The backlight module as claimed in claim 2, further comprising
   a transparent film layer disposed on the light emitting layer and the reflection layer, wherein material of the transparent film layer is silicone; and
   a diffusion film disposed on a side of the light guide plate away from the reflection plate.

4. The backlight module as claimed in claim 3, wherein a third via hole is defined in the diffusion film and corresponds to the second via hole.

5. The backlight module as claimed in claim 4, wherein a diameter of the third via hole is greater than a diameter of the second via hole; and
   the diameter of the second via hole is equal to a diameter of the first via hole.

6. The backlight module as claimed in claim 2, wherein the light guide plate and the light emitting layer are arranged abreast, and a portion of the light guide plate is disposed on the reflection layer.

7. The backlight module as claimed in claim 2, wherein the light guide plate is disposed around the reflection layer.

8. The backlight module as claimed in claim 1, wherein an area of the light guide plate is greater than or equal to an area of the reflection plate.

9. The backlight module as claimed in claim 1, wherein the light emitting layer is a mini-light emitting diode (Mini-LED) light emitting layer and comprises a white light emitting unit, a red light emitting unit, a green light emitting unit and a blue light emitting unit.

10. A display device, comprising the backlight module as claimed in claim 1; wherein the display device further comprises a camera module disposed under the backlight module and corresponding to the first via hole.

* * * * *